US010497121B2

(12) United States Patent
An et al.

(10) Patent No.: US 10,497,121 B2
(45) Date of Patent: Dec. 3, 2019

(54) METHOD AND SYSTEM FOR EXTRACTING A MAIN SUBJECT OF AN IMAGE

(71) Applicant: ALIBABA GROUP HOLDING LIMITED, George Town, Grand Cayman (KY)

(72) Inventors: Shan An, Hangzhou (CN); Hongming Zhang, Hangzhou (CN); Bin Liu, Hangzhou (CN); Guocheng Chen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 245 days.

(21) Appl. No.: 15/499,840

(22) Filed: Apr. 27, 2017

(65) Prior Publication Data

US 2017/0228872 A1    Aug. 10, 2017

Related U.S. Application Data

(63) Continuation of application No. PCT/CN2015/092505, filed on Oct. 22, 2015.

(30) Foreign Application Priority Data

Oct. 27, 2014   (CN) .......................... 2014 1 0584982

(51) Int. Cl.
*G06T 7/11* (2017.01)
*G06T 7/194* (2017.01)
(Continued)

(52) U.S. Cl.
CPC .................. *G06T 7/11* (2017.01); *G06K 9/34* (2013.01); *G06T 7/12* (2017.01); *G06T 7/143* (2017.01);
(Continued)

(58) Field of Classification Search
None
See application file for complete search history.

(56) References Cited

U.S. PATENT DOCUMENTS

| 2004/0091153 | A1* | 5/2004 | Nakano | G06K 9/00228 |
| | | | | 382/228 |
| 2004/0120581 | A1* | 6/2004 | Ozer | G06K 9/00335 |
| | | | | 382/224 |

(Continued)

FOREIGN PATENT DOCUMENTS

| CN | 102467740 A | 5/2012 |
| CN | 102598113   | 7/2012 |

(Continued)

OTHER PUBLICATIONS

Duffner, Stefan, and Jean-Marc Odobez. "Leveraging colour segmentation for upper-body detection." Pattern Recognition 47.6 (2014): 2222-2230. 11 pages (Year: 2014).*

(Continued)

*Primary Examiner* — Ryan P Potts
(74) *Attorney, Agent, or Firm* — Finnegan, Henderson, Farabow, Garrett & Dunner, LLP

(57) ABSTRACT

A method includes determining whether a region to be recognized corresponding to a specified feature exists in an image to be processed. The method may also include determining a main subject region containing the main subject of the image to be processed in accordance with a preset feature parameter of the main subject region and the coordinates and size of the region to be recognized when the region to be recognized exists. The method may further include extracting an image of the main subject region as a foreground image for an extraction process of a foreground target, and taking the extracted image as the main subject of the image to be processed.

18 Claims, 16 Drawing Sheets

(51) Int. Cl.
  G06K 9/34 (2006.01)
  G06T 7/12 (2017.01)
  G06T 7/143 (2017.01)
(52) U.S. Cl.
  CPC .... *G06T 7/194* (2017.01); *G06T 2207/10024* (2013.01); *G06T 2207/20076* (2013.01); *G06T 2207/30196* (2013.01); *G06T 2207/30201* (2013.01)

(56) References Cited

U.S. PATENT DOCUMENTS

| | | | |
|---|---|---|---|
| 2006/0177097 A1* | 8/2006 | Fujimura | G06K 9/00362 382/103 |
| 2007/0237355 A1* | 10/2007 | Song | G06K 9/00369 382/100 |
| 2010/0067742 A1* | 3/2010 | Ogawa | G06K 9/00369 382/103 |
| 2011/0299776 A1* | 12/2011 | Lee | G06K 9/00234 382/173 |
| 2012/0327172 A1* | 12/2012 | El-Saban | G06K 9/00228 348/14.02 |
| 2013/0058535 A1* | 3/2013 | Othmezouri | G06K 9/00369 382/103 |
| 2013/0142423 A1 | 6/2013 | Zhang et al. | |
| 2014/0056518 A1* | 2/2014 | Yano | G06K 9/6267 382/173 |

FOREIGN PATENT DOCUMENTS

| | | |
|---|---|---|
| CN | 102779270 A | 11/2012 |
| CN | 103164858 | 6/2013 |
| JP | 2011035636 A | 2/2011 |
| JP | 2013210968 A | 10/2013 |
| WO | WO 2012/077286 A1 | 5/2014 |
| WO | WO 2016/066038 A1 | 5/2016 |

OTHER PUBLICATIONS

Li, Shifeng, Huchuan Lu, and Lei Zhang. "Arbitrary body segmentation in static images." Pattern recognition 45.9 (2012): 3402-3413. 12 pages (Year: 2012).*

PCT International Search Report dated Jan. 18, 2016, issued in corresponding International Application of. PCT/CN2015/092505 (5 pages).

First Office Action issued from The State Intellectual Property Office of People's Republic of China, in corresponding Chinese Application No. 201410584982.3, dated May 21, 2018 (16 pgs.).

Second Office Action issued from The State Intellectual Property Office of People's Republic of China, in corresponding Chinese Application No. 201410584982.3, dated Oct. 24, 2018 (21 pgs.).

AITA et al., "Color Information Extraction for Clothing Image Mining," The Institute of Electronics, Information and Communication Engineers, vol. 111 No. 479, pp. 235-240 (2012).

MATSUDA, et al., "Clothing Region Estimation and Color Information Extraction of Street Snap," FIT2012, 11th Forum on Information Technology, pp. 395-398 (2012).

TSITSOULIS et al., "Automatic Extraction of Upper Human Body in Single Images," IISA https://ieeexploreleee.org/stamp.jsp?tp=&arnumber=6623733 (2013).

WU et al., "Clothing Extraction by Coarse Region Localization and Fine Foreground/Background Estimation," MMM 2013, Part II, LNCS 7733, pp. 316-326 (2013).

Japanese Search Report issued in Japanese Application No. 2017-521554 dated Sep. 18, 2019, 59 pages.

* cited by examiner

METHOD AND SYSTEM FOR EXTRACTING A MAIN SUBJECT OF AN IMAGE

CROSS REFERENCE TO RELATED APPLICATION

The disclosure claims the benefits of priority to International Application No. PCT/CN2015/092505, filed on Oct. 22, 2015, which claims priority to and the benefits of priority to Chinese Application No. CN 201410584982.3, filed Oct. 27, 2014, both of which are incorporated herein by reference in their entireties.

TECHNICAL FIELD

The present application relates to the technical field of image processing, and more particularly, to a method for extracting a main subject of an image. The present application also relates to a system for extracting a main subject of an image.

BACKGROUND

In recent years, with the development of technologies and the transition of people's concept, online shopping gradually becomes one of the main channels for shopping. Online shopping platforms have been well developed. Under such circumstances, online shopping platforms have accumulated a large amount of product images. How to effectively organize, analyze, retrieve, and display these product images to consumers has become very important.

The contents of a product image include a main subject and a background. When a user uploads an image of a product and hopes to search for the same or similar products, the user is mainly concerned with the product. The existence of the background may affect the search result for the product. Therefore, it has become an important task to extract the main subject of a product image. Traditional methods for extracting a main subject of an image are based on manual intervention. That is, the segmented regions have to be frame selected and set manually, which has low efficiency. Thus, they are not suitable for hundreds of millions of images on the Internet. Therefore, it is required to design a method for automatically extracting a main subject of a product image, which can accurately extract a specific content in the image.

SUMMARY

In one aspect, the present disclosure is directed to a method for extracting a main subject of an image to realize accurate determination and extraction of the contents of the main subject of the image. The method may include determining whether a region to be recognized corresponding to a specified feature exists in the image to be processed. The method may also include determining a main subject region containing the main subject of the image to be processed in accordance with a preset feature parameter of the main subject region and the coordinates and size of the region to be recognized when the region to be recognized exists. The method may further include extracting an image of the main subject region as a foreground image for an extraction process of a foreground target, and taking the extracted image as the main subject of the image to be processed.

In another aspect, the present disclosure is directed to a system for extracting a main subject of an image. The system may include a determination module configured to determine whether a region to be recognized corresponding to a specified feature exists in the image to be processed. The system may also include a rectangle-frame acquisition module configured to determine a main subject region containing the main subject of the image to be processed in accordance with a preset feature parameter of the main subject region and the coordinates and size of the region to be recognized when the region to be recognized exists. The system may further include an extraction module configured to extracting an image of the main subject region as a foreground image for an extraction process of a foreground target, and taking the extracted image as the main subject of the image to be processed.

Through the technical solutions of the embodiments of the present disclosure, a main subject region of an image to be processed is acquired with different methods respectively in accordance with whether the image to be processed has a region to be recognized corresponding to a specified feature. A preset algorithm is performed on the image of the main subject region. The image corresponding to the foreground region extracted through the algorithm is used as the main subject of the image to be processed. Thus the extracted main subject is accurate and reliable while the extraction of the main subject is automated. The processing efficiency is improved accordingly.

DETAILED DESCRIPTION

As mentioned in the background section, the existing image extraction technologies cannot take both the efficiency and accuracy of image extraction into account. For this end, the present disclosure proposes a method for extracting a main subject of an image. After determining that a region to be recognized corresponding to a specified feature exists in the image to be processed, the method includes determining a main subject region containing the main subject of the image to be processed in accordance with a preset feature parameter of the main subject region and the coordinates and size of the region to be recognized. The method also includes extracting an image of the main subject region as a foreground image for an extraction process of a foreground target. Thus the extracted main subject is accurate and reliable while the extraction of the main subject is automated. The processing efficiency is improved accordingly.

Figure 1:
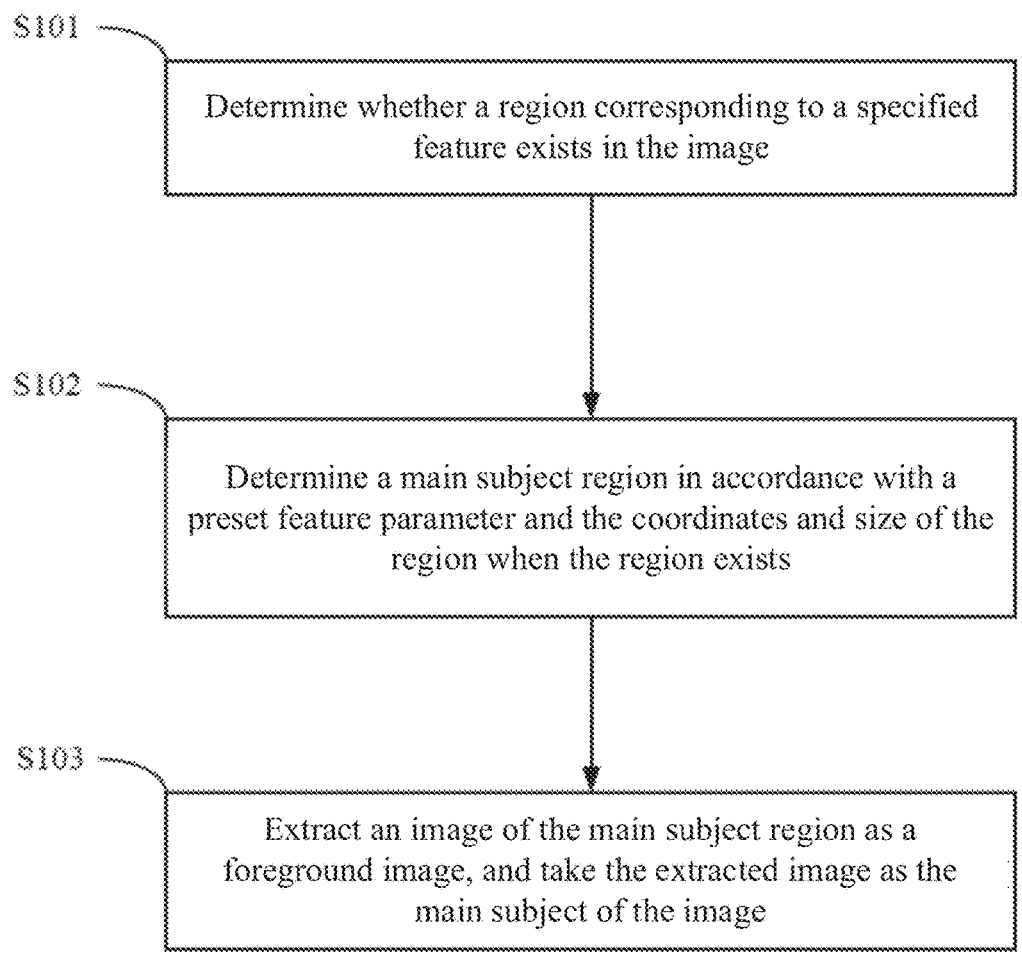
FIG. 1 is a flowchart of an exemplary method for extracting a main subject of an image, according to an embodiment of the present disclosure.

FIG. 1 is a flowchart of an exemplary method for extracting a main subject of an image, according to an embodiment of the present disclosure. The method includes the following steps.

S101: Determine whether a region to be recognized corresponding to a specified feature exists in the image to be processed.

Based on an expected main subject image to be extracted, the method of the present disclosure may specify a relevant feature for the main subject in advance and perform a fine extraction operation through detecting a region to be recognized corresponding to the specified feature.

For the most part, there is a large number of original images. To improve efficiency, the method of the present disclosure may use a preprocessing mechanism to screen the large number of original images for the images be processed. To reduce the number of the images to be processed, the preprocessing mechanism may include determining whether original images have solid color backgrounds to select the images for easily displaying its main subject. Thus, before this step, the following steps of operations may be performed in advance.

(a) Perform superpixel segmentation on the image to be processed, and determining an average color value of each segmented superpixel block.

Superpixels are small regions including a number of adjacent pixels that have similar features, such as color, brightness, and texture. In most cases, these regions retain useful information for further image segmentation and will not destroy edge information about an object in the image. After segmenting an image into superpixel regions without strong edges by superpixel image segmentation, an average color value of each superpixel block may be estimated by a color model, such as a Lab color space.

(b) Determine a score of a solid color background of the image to be processed, and determine whether the image to be processed has a solid color background in accordance with the score of the solid background color.

Based on the Lab colors used in the previous step, this step may include clustering the average Lab color values of the superpixel blocks at four sides of the image to be processed in accordance with a set of preset parameters. This step may also include adopting the color value represented by the clustering center containing more data points after the clustering as the background color of the image to be processed. In some embodiments, this step may include determining a score of a solid color background of the image to be processed, the score of the solid color background includes a ratio of the number of pixels contained in a superpixel block satisfying a color threshold of the background color to the total number of pixels of the image to be processed. After obtaining the score of the solid color background, the step may further include determining whether the score of the solid color background is higher than the preset threshold. If the determination result is yes, it is confirmed that the image to be processed has a solid color background. If not, the step may further include determining whether a region to be recognized corresponding to a specified feature exists in the image to be processed.

In some embodiments, the method of the present disclosure may perform superpixel segmentation by the simple linear iterative clustering (SLIC) method. The method may include converting the image data from an initial color space to a CIELAB color space and forming a 5-dimension data space by adding the positions of normalized pixels. The method may also include selecting K clustering centers $c_k=[l_k,a_k,b_k,x_k,y_k]^T$ that specify a grid distance S. The method may further include calculating the distances from each data point within a 2S×2S range around the clustering centers to the clustering centers, and grouping each data point into the closest cluster.

Figure 2:
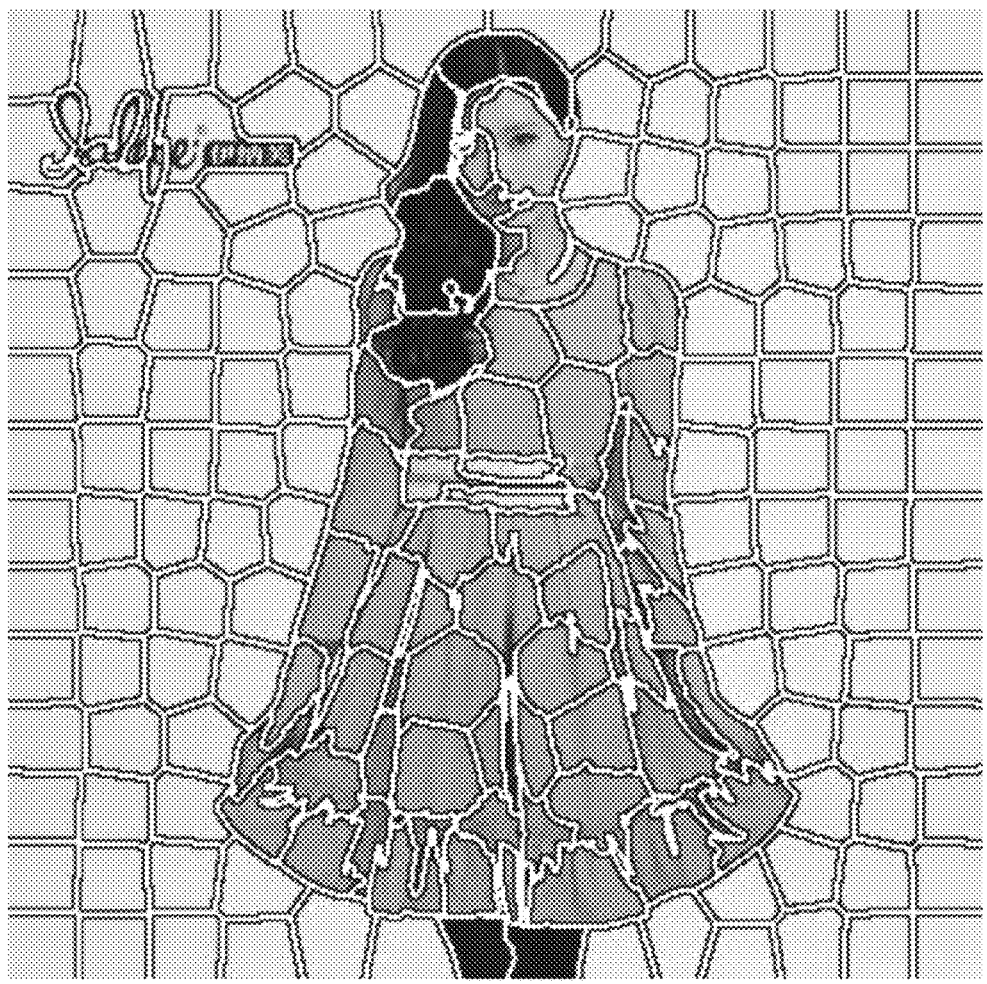
FIG. 2 is a schematic diagram of an exemplary result of superpixel segmentation of a product image, according to an embodiment of the present disclosure.

In the above process, the calculation formula of the distance $D_s$ is as follows:

$$d_{lab} = \sqrt{(I_k - I_i)^2 + (a_k - a_i)^2 + (b_k - b_i)^2} \quad (1)$$

$$d_{xy} = \sqrt{(x_k - x_i)^2 + (y_k - y_i)^2} \quad (2)$$

$$D_s = d_{lab} + \frac{m}{s} d_{xy} \quad (3)$$

where m is a closeness factor. In this example, the number of superpixels is set as 200 and the closeness factor is set as 10. A product image may be segmented into about 200 superpixel blocks. FIG. 2 is a schematic diagram of an exemplary result of superpixel segmentation of the product image.

Subsequently, an average Lab color value of each superpixel block is calculated as follows:

$$(\overline{L}_m,\overline{a}_m,\overline{b}_m)=(\Sigma_1^n L_i/n,\ \Sigma_1^n a_i/n,\ \Sigma_1^n b_i/n) \quad (4)$$

The average Lab color values of those superpixel blocks close to the four sides of the image are selected and clustered through a k-means clustering with k=2 and the data dimension being 3 to obtain the color value, represented by the clustering center containing more data points, as the background color of the image $(L_B,a_B,b_B)$.

The number of pixels contained in a superpixel block complying with the following formula is calculated.

$$p_\theta:(\overline{L}_m-L_B)^2+(\overline{a}_m-a_B)^2+(\overline{b}_m-b_B)^2<\theta \qquad (5)$$

where θ is a preset color threshold. If the distance from the average color value of a superpixel block to the background color of the image is smaller than θ, it is determined that the color of the superpixel block is the same as the background color of the image. The threshold is set as 100 in this example.

Finally, the score of the solid color background of the image is calculated as follows:

$$pr=p_\theta/p_{all} \qquad (6)$$

where $P_{all}$ is the total number of pixels of the image. According to experiments, if the score of the solid color background is greater than 0.3, the product image has a solid color background. There is no need to extract the main subject of a product image when it has a solid color background.

It should be noted that acquiring the score of the solid color background through the Lab color space and clustering is merely one of implementation methods in the present disclosure. After the above processing, recognition may be performed in accordance with a specified feature specified by a technical person. The steps are as follows:

A1: Determine whether a region to be recognized corresponding to a specified feature exists in the image to be processed. If the region exists, proceed with step B1. If the region does not exist, the processing is ended.

B1: Perform profile detection on the region corresponding to the specified feature in the image to be processed, and verify the detected region in accordance with a parameterization appearance model corresponding to the specified feature to confirm whether the region is the region to be recognized corresponding to the specified feature.

In most application scenarios, the main subject extraction of the clothing from an image including a person is the most important. Therefore, a human head-shoulder region associated thereto is taken as an exemplary specified feature, according to an embodiment of the present disclosure. After determining whether a region of the image to be processed corresponding to a human-face feature exists in the human head-shoulder region, the step may include detecting a region corresponding to the region of the human head and shoulders in the image to be processed in accordance with an upper body detection algorithm and a head-shoulder profile detector. The step may further include verifying the detected region in accordance with a head-shoulder appearance model to confirm whether the region is a region to be recognized corresponding to the human head-shoulder region.

In some embodiments, the head-shoulder profile detection in the above step may be obtained through training with an adaptive boosting (AdaBoost) algorithm in combination with a histogram of oriented gradients (HoG) feature. The head-shoulder appearance model may be established in accordance with a depth network model. The significance detection may be performed based on a global uniqueness method in combination with a color space distribution method. Those people skilled in the art may adopt other algorithms or optimization models based on these embodiments, all of which are contained within the scope of the present disclosure.

In some embodiments, the method of the present disclosure may be applied to the product image processing of clothing items. For example, the method may include using women's dress images as a training data set. The method may also include detecting the face in an image of a woman's dress based on a face detection algorithm. The method may include detecting, by a method of upper body detection, the positions of head, neck, left shoulder and right shoulder of an upper body in an image on which a single face is detected. According to certain requirements, those images that were erroneously detected may be removed manually. The method may further include training the head-shoulder detector by the AdaBoost algorithm in combination with the HoG feature. Compared with a Haar feature used in a face detection, the HoG feature is more biased towards profile description and is more suitable for the head-shoulder detection. In some embodiments, the method may achieve a high detection rate and low false alarm rate by training a 13-class AdaBoost classifier with 5 W positive samples and 5 W negative samples.

Figure 3:
FIG. 3 is a schematic diagram of an exemplary result of a head-shoulder detection of a product image, according to an embodiment of the present disclosure.

Since the HoG feature merely follows closely to the appearance of a target object's profile, a considerable number of false alarms occur while those profiles similar to the head-shoulder profile are detected by using the AdaBoost detector. To reduce the false alarms, the method may further include using a head-shoulder appearance model in accordance with a depth network model. Accordingly, the method may further verify the results of the AdaBoost detection in accordance with the appearance feature of the target. In some embodiments, the combination the two greatly reduces the false alarm rate without significantly reducing the detection rate. FIG. 3 is a schematic diagram of an exemplary result of a head-shoulder detection of a product image.

S102: Determine a main subject region containing the main subject of the image to be processed in accordance with a preset feature parameter of the main subject region and the coordinates and size of the region to be recognized when the region to be recognized exists.

After determining the region to be recognized corresponding to the specified feature exists in the image to be processed in step S101, the method may include estimating a rectangle frame enclosing the region of the human body, in accordance with a preset feature parameter of the main subject region, for the image on which a head and shoulders is detected to saving the running time of the algorithm. The preset parameters may be set flexibly in accordance with previous experimental statistics to achieve a pre-estimation effectiveness. Different values do not affect the scope of the present disclosure.

Figure 4:
FIG. 4 is a schematic diagram of an exemplary result of estimating a rectangle in accordance with a head-shoulder detection, according to an embodiment of the present disclosure.

In some embodiments, the method may include obtaining the coordinates (RectX, RectY) of the upper left vertex on the head-shoulder frame and the length of the side (Length) in step S101. Through experiments with a large amount of clothing product images containing a human head and shoulders, the most suitable parameters of the rectangle frame enclosing the region of the human body may be estimated. FIG. 4 is a schematic diagram of an exemplary result of estimating a rectangle in accordance with a head-shoulder detection. The parameters of the rectangle frame are set as follows:

$$X\text{-coordinate of the upper left vertex}=RectX-0.5*Length \qquad (7)$$

$$Y\text{-coordinate of the upper left vertex}=RectY+0.7*Length \qquad (8)$$

$$\text{Width of the rectangle frame}=Length*2 \qquad (9)$$

$$\text{Height of the rectangle frame}=Length*10 \qquad (10)$$

When the region to be recognized corresponding to the specified feature is determined to be non-existent in step S101, the method may further include performing a significance detection on the image to be processed, and determining the main subject region of the image to be processed in accordance with a significance value of each pixel in the image to be processed after the detection.

In some embodiments, determining the main subject region through the significance value may include the following steps.

(a) Perform a binarization process to a significance map including the significance values.

(b) Perform a clean-up process to smaller color blocks in the binarized image.

(c) Search for a profile line of each color block in the image after performing the clean-up process, and approximate to the profile line of the each color block by a polygon.

(d) Enclose each polygon by a rectangle, and take a peripheral rectangle frame enclosing all rectangles as the main subject region.

It is noted that there are many methods for detecting a significance value of each pixel in a product image. The above description of the method is an example of performing the significance detection on the product image in accordance with a Global Uniqueness method in combination with a Color Spatial Distribution method. The present disclosure does not impose any limitation on this. Those people skilled in the art may also use other alternative methods, including a method based on histogram contrast (HC), a method based on region contrast (RC), a context awareness (CA) method, and a frequency tuned (FT) method to implement the recognition of a main subject region with reference to the above steps. These are all within the scope of the present disclosure.

In some embodiments, a Global Uniqueness method in combination with a Color Spatial Distribution method may be adopted to perform the significance detection on the product image. First, the method may including clustering the image colors and representing them by a Gaussian mixture model (GMM). The color of each pixel, Is, is represented by a weighted combination of a plurality of GMM components. The probability of a certain component c is as follows:

$$p(c \mid I_X) = \frac{w_c N\left(I_X \mid \mu_c, \sum_c\right)}{\sum_c w_c N\left(I_X \mid \mu_c, \sum_c\right)} \quad (11)$$

The correlation between two GMM components $c_i$ and $c_j$ is shown as follows:

$$C(c_i, c_j) = \frac{\sum_{I_X} \min(p(c_i \mid I_X), p(c_j \mid I_X))}{\min\left(\sum_{I_X} p(c_i \mid I_X), \sum_{I_X} p(c_j \mid I_X)\right)} \quad (12)$$

In the Global Uniqueness method, a global component $c_i$ is represented as a weighted color contrast relative to all the other components:

$$U(c_i) = \sum_{c_j \neq c_i} \exp\left(\frac{D(c_i, c_j)}{-\sigma^2}\right) \times \omega_{c_j} \times \|\mu_{c_i} - \mu_{c_j}\| \quad (13)$$

where $D(c_i, c_j)$ is the spatial distance between the centers of two GMM components $c_i$ and $c_j$.

The Color Spatial Distribution method include calculating a horizontal spatial variance of a cluster component C:

$$V_h(C) = \frac{1}{|X|_C} \sum_x p(C \mid I_x) \times |X_h - M_h(C)|^2 \quad (14)$$

$$M_h(C) = \frac{1}{|X|_C} \sum_x p(C \mid I_x) \times X_h \quad (15)$$

$$|X|_C = \sum_x p(C \mid I_x) \quad (16)$$

where $x_h$ is the x-coordinate of pixel x.

The spatial variance of cluster component C is:

$$V(C) = V_h(C) + V_v(C) \quad (17)$$

The definition of a vertical spatial variance $V_v(C)$ is similar to that of the horizontal spatial variance $V_h(C)$. The value of the color spatial distribution is:

$$S(C) = (1 - V(C)) \times (1 - D(C)) \quad (18)$$

where $D(C) = \Sigma_x p(C \mid I_x) d_x$.

Figure 5A:
FIG. 5A is a schematic diagram of an exemplary original product image without a head and shoulders detected, according to an embodiment of the present disclosure.
Figure 5B:
FIG. 5B is a schematic diagram of an exemplary significance of the product based on FIG. 5A, according to an embodiment of the present disclosure.

FIG. 5A is a schematic diagram of an exemplary original product image without a head and shoulders detected. FIG. 5B is a schematic diagram of an exemplary significance of the product based on FIG. 5A.

Figure 6A:
FIG. 6A is a schematic diagram of an exemplary binarized significance of the product, according to an embodiment of the present disclosure.
Figure 6B:
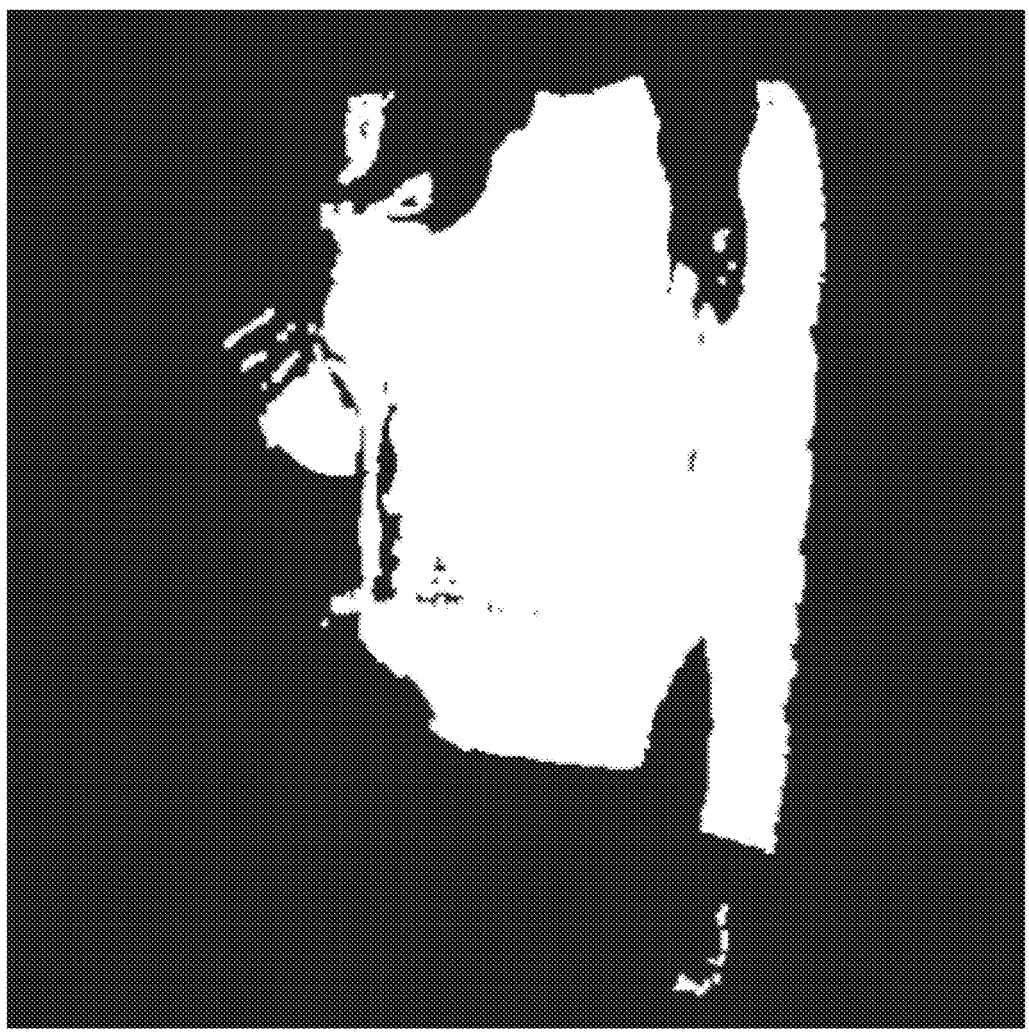
FIG. 6B is a schematic diagram of enclosing each polygon by a rectangle, according to an embodiment of the present disclosure.
Figure 6C:
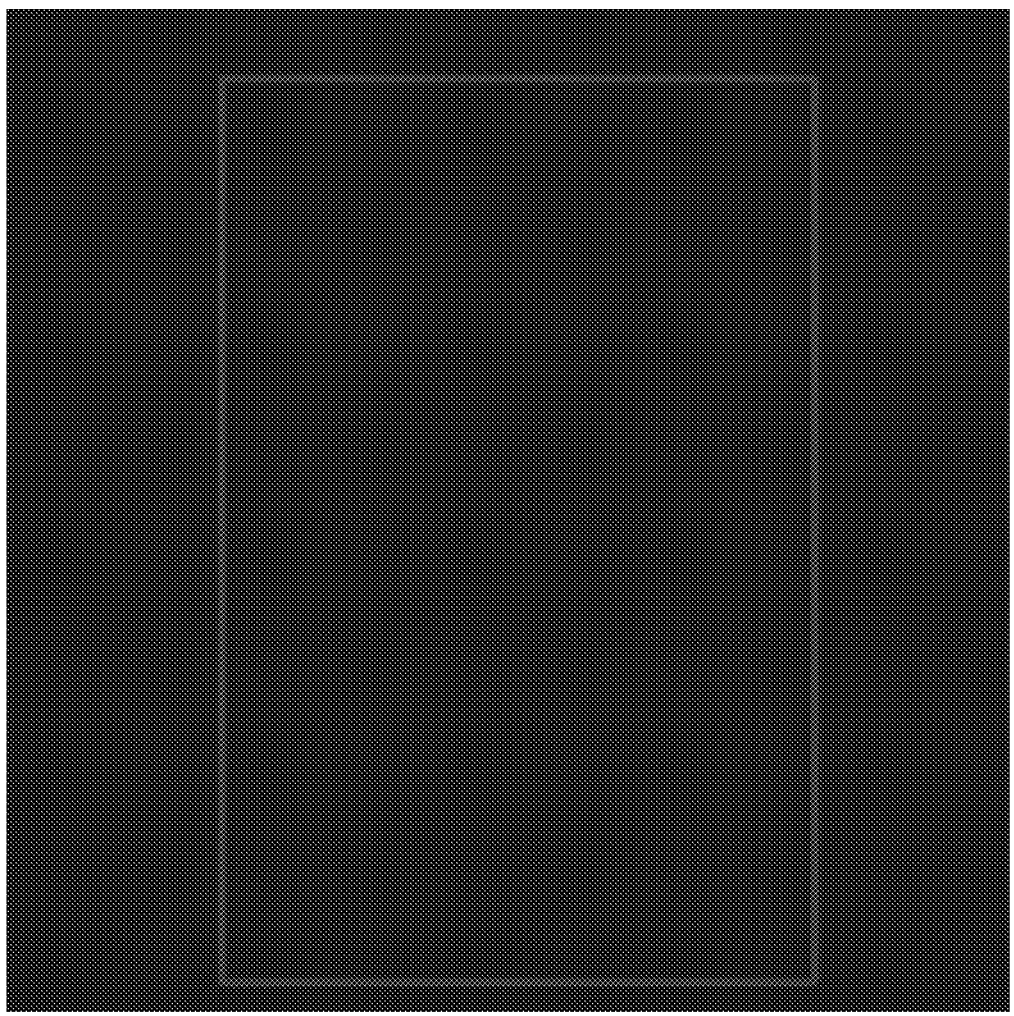
FIG. 6C is a schematic diagram of a peripheral rectangle enclosing all rectangles, according to an embodiment of the present disclosure.

In some embodiments, for the images on which no head and shoulders are detected, the method may include detecting the significance value of the image by the above steps. The method may also include binarizing the significance value of the product image to constitute a significance map with a binarization threshold set to be 0.1. The method may further include obtaining the profiles of all color blocks and the areas of the enclosed regions in the binarized image and removing those regions that are smaller than the threshold. The threshold is set to be 5000 for removing those smaller color blocks in the binarized image. In addition, the method may include searching for profile lines of all remaining color blocks in the image, and approximating to the profile line of each color block by a polygon. Moreover, the method may include enclosing each polygon by a rectangle, and taking a peripheral rectangle frame enclosing all rectangles as the main subject region. FIGS. 6A, 6B, and 6C are schematic diagrams of an exemplary binarized significance of the image, an example of enclosing each polygon by a rectangle, a peripheral rectangle enclosing all rectangles, respectively.

S103: Extract an image of the main subject region as a foreground image for an extraction process of a foreground target, and take the extracted image as the main subject of the image to be processed.

In order to make the main subject region more accurate, before this step, the method of the present disclosure may include an optimization mechanism for the main subject image. The steps of the optimization mechanism are as follows:

(a) Determine whether the average significance value of each superpixel block is higher than a preset threshold successively.

(b) Set an image mask value of each pixel in a superpixel block as nonzero when the average significance value of the superpixel block is higher than the preset threshold.

(c) Update the main subject region by using a peripheral rectangle frame enclosing the pixels of nonzero image mask values.

After the above processing, the obtained main subject region is more accurate and reliable. After determining the main subject region, the method may include setting the image of the main subject region as a foreground image and initializing a GrabCut algorithm. The GrabCut algorithm is an effective interactive segmentation algorithm for extracting a foreground target from a complex background. The algorithm uses a Gaussian mixture model to describe pixel distribution and achieves energy minimization by an iterative estimation method. It is one of excellent and practicable algorithms nowadays. Therefore, the method of the present disclosure includes performing the GrabCut algorithm on the foreground image to obtain the main subject of the image to be processed. However, this is not the only method. Those people skilled in the art may utilize other extraction algorithms to obtain the main subject based on the method of the present disclosure. Those embodiments are within the scope of the present disclosure.

Figure 7A:
FIG. 7A is a schematic diagram of an exemplary final result of main subject extraction from a product image that a head and shoulders are detected, according to an embodiment of the present disclosure.
Figure 7B:
FIG. 7B is a schematic diagram of an exemplary final result of main subject extraction from a product image that a head and shoulders are not detected, according to an embodiment of the present disclosure.
Figure 8:
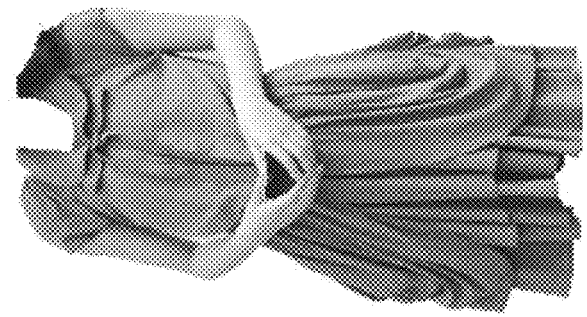
FIG. 8 is a schematic diagram of exemplary effectiveness of main subject extraction, according to an embodiment of the present disclosure.
Figure 8:
Figure 9:
FIG. 9 is another schematic diagram of exemplary effectiveness of main subject extraction, according to an embodiment of the present disclosure.
Figure 9:
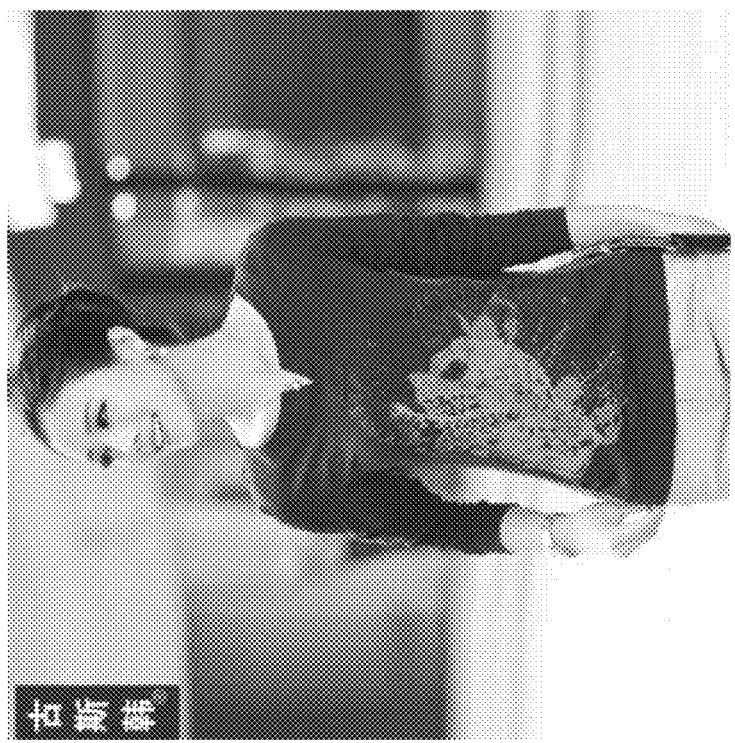
Figure 10:
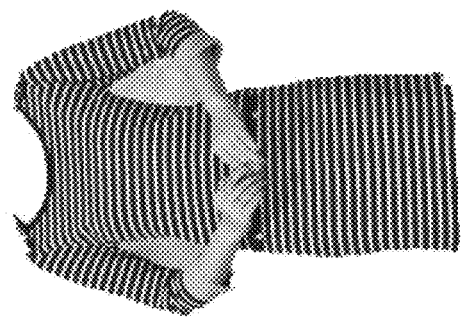
FIG. 10 is another schematic diagram of exemplary effectiveness of main subject extraction, according to an embodiment of the present disclosure.
Figure 10:
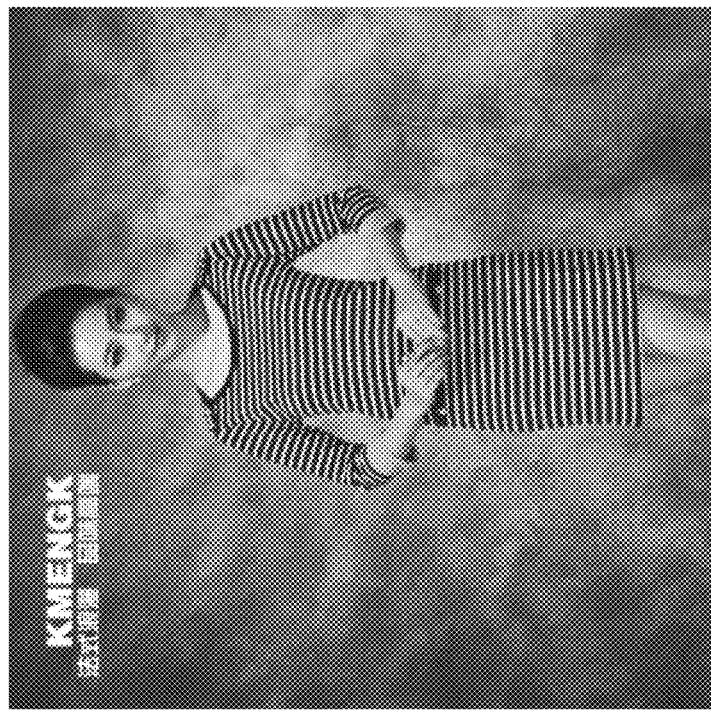
Figure 11:
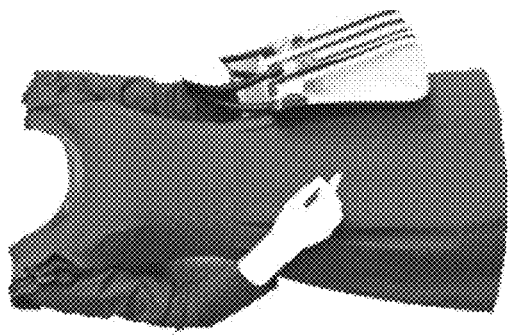
FIG. 11 is another schematic diagram of exemplary effectiveness of main subject extraction, according to an embodiment of the present disclosure.
Figure 11:

In some embodiments, the method of the present disclosure may include performing superpixel segmentation on the product image in this step. The superpixel segmentation may be implemented through a simple linear iterative clustering (SLIC) method. The product image may be segmented into 20 superpixel blocks by setting the number of superpixels to be 20 and the closeness factor to be 10. The method may also include determining an average significance value of all pixels in each superpixel block. The method may also include setting an image mask value of each pixel in a superpixel block to be nonzero when the average significance value of the superpixel block is higher than the preset threshold. The threshold is set as 0.6 in this example. In addition, the method may include obtaining a peripheral rectangle frame that encloses the pixels of nonzero image mask values. Moreover, the method may include setting the image within the rectangle frame as the foreground image, setting the image outside the rectangle frame as the background image, and initializing the GrabCut algorithm. The GrabCut algorithm uses a Gaussian mixture model and implements the image segmentation through continuously mutual iterations of segmentation estimation and learning of the model parameters. The method may include setting the foreground image obtained from the GrabCut algorithm as the main subject of the product. FIGS. 7A and 7B are schematic diagrams of exemplary final results of main subject extraction from the product images that a head and shoulders are detected and not detected, respectively. FIGS. 8, 9, 10, and 11 are schematic diagrams of exemplary effectiveness of main subject extraction, respectively.

Figure 12:
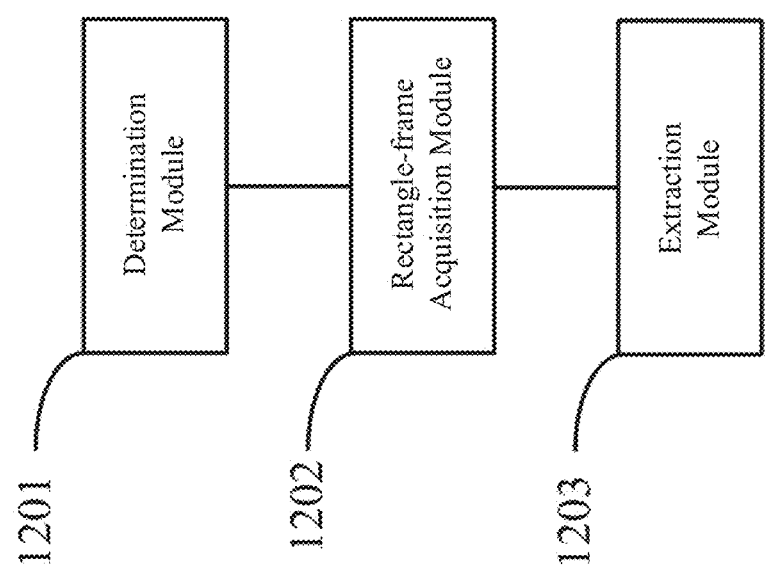
FIG. 12 is a structure diagram of an exemplary image extraction system, according to an embodiment of the present disclosure.

In another aspect, the present disclosure relates to a system for extracting a main subject of an image, corresponding to the method for extracting a main subject of an image. FIG. 12 is a structure diagram of the exemplary image extraction system. The system may include:

a determination module 1201 configured to determine whether a region to be recognized corresponding to a specified feature exists in the image to be processed;

a rectangle-frame acquisition module 1202 configured to determine a main subject region containing the main subject of the image to be processed in accordance with a preset feature parameter of the main subject region and the coordinates and size of the region to be recognized when the region to be recognized exists; and an extraction module 1203 configured to extracting an image of the main subject region as a foreground image for an extraction process of a foreground target, and taking the extracted image as the main subject of the image to be processed.

In some embodiments, the system may also include:

a segmentation module configured to perform superpixel segmentation on the image to be processed, and determine an average color value of each segmented superpixel block;

a background color module configured to determine a background color of the image to be processed in accordance with the average color value of each superpixel block; and a solid color determination module configured to determine a score of a solid color background of the image to be processed and determine whether the image to be processed has a solid color background in accordance with the score of the solid background color. The score of the solid color background includes a ratio of the number of pixels contained in a superpixel block satisfying a color threshold of the background color to the total number of pixels of the image to be processed.

In some embodiments, the determination module may include:

a detection sub-module configured to detect whether a region corresponding to the specified feature in the image to be processed; and a confirmation sub-module configured to perform profile detection on the region corresponding to the specified feature in the image to be processed when the detection sub-module detects that the region corresponding to the specified feature exists, and verify a detected region in accordance with a parameterization appearance model corresponding to the specified feature to confirm whether the region is the region to be recognized corresponding to the specified feature.

In some embodiments, the specified feature may include a region of a human head and shoulders. The confirmation sub-module may be configured to detect a region corresponding to the region of the human head and shoulders in the image to be processed in accordance with an upper body detection algorithm and a head-shoulder profile detector, and verify the detected region in accordance with a head-shoulder appearance model.

In some embodiments, the head-shoulder profile detector may be obtained through training by an AdaBoost algorithm in combination with a HoG feature. The head-shoulder appearance model may be established in accordance with a depth network model.

In some embodiments, the system may further include a significance detection module configured to, when the region to be recognized does not exist, perform a significance detection on the image to be processed, and determine the main subject region of the image to be processed in accordance with a significance value of each pixel in the image to be processed after the detection.

In some embodiments, the significance detection module may be configured to perform a binarization process to a significance map including the significance values, and perform a clean-up process to one or more smaller color blocks in the binarized image. The significance detection module may also be configured to search for a profile line of each color block in the image after performing the clean-up process, and approximate to the profile line of the each color block by a polygon. The significance detection module may further configured to enclose each polygon by a rectangle, and take a peripheral rectangle frame enclosing all rectangles as the main subject region.

In some embodiments, the system may further include a rectangle-frame update module configured to perform superpixel segmentation on the image to be processed, and determine an average significance value of all pixels in each superpixel block. The rectangle-frame update module may also be configured to determine whether the average significance value of each superpixel block is higher than a preset threshold successively, and set an image mask value of each pixel in a superpixel block as nonzero when the average significance value of the superpixel block is higher than the preset threshold. The rectangle-frame update module may further configured to update the main subject region by using a peripheral rectangle frame enclosing the pixels of nonzero image mask values.

In some embodiments, the extraction module may be configured to set the image of the main subject region as the foreground image, and initialize a GrabCut algorithm. The extraction module may also be configured to perform the GrabCut algorithm on the foreground image.

In the technical solutions of the present disclosure, a main subject region of an image to be processed is acquired by using different methods, according to whether a region to be recognized corresponding to a specified feature exists in the image to be processed. A preset algorithm is performed on the image of the main subject region. The image corresponding to the foreground region extracted through the algorithm is used as the main subject of the image to be processed. Thus, the extracted main subject is accurate and reliable by the automated image extraction of the main subject. Accordingly, the processing efficiency is improved.

From the descriptions of the above embodiments, those people skilled in the art can understand that the methods and systems of the present disclosure may be implemented by hardware. The methods and systems of the present disclosure may also be implemented by software plus a required universal hardware platform. The technical solutions of the present disclosure may be implemented as a software product. The software product may be stored in a non-volatile storage medium (which can be a CD-ROM, a flash drive, a portable hard disk, and so on). The software product may include instructions to cause a computer apparatus (which can be a personal computer, a server, or a network apparatus) to execute the methods in various embodiments of the present disclosure.

It is understood by those people skilled in the art that the drawings are merely schematic diagrams of preferred scenarios and embodiments. Those modules or procedures in the drawings may or may not be required for the implementation of the present disclosure.

It is understood by those people skilled in the art that those modules of the apparatus units may be deployed in the apparatus units in accordance with the descriptions of the implementation scenarios. They may also be deployed into one or multiple apparatus units different from that in the described scenario. The above modules for implementing the described scenarios may be combined as one module. They may also be split into a plurality of sub-modules.

The order of the above embodiments of the present disclosure is merely for illustration and does not stand for the quality of the embodiments and the scenarios.

The foregoing descriptions merely disclose several embodiments and scenarios of the present disclosure. However, the present disclosure is not limited thereto. All variations that those people skilled in the art may come out shall fall into the scope of the present disclosure.

What is claimed is:

1. A method for extracting a main subject of an image, the method comprising:
    performing superpixel segmentation on the image to be processed;
    determining an average color value of each segmented superpixel;
    determining a background color of the image to be processed in accordance with the average color value of each superpixel;
    determining a score of a solid color background of the image to be processed;
    determining whether the image to be processed has a solid color background in accordance with the score of the solid background color, wherein the score of the solid color background includes a ratio of the number of pixels contained in a superpixel satisfying a color threshold of the background color to the total number of pixels of the image to be processed;
    determining whether a region to be recognized corresponding to a specified feature exists in the image to be processed;
    determining a main subject region containing the main subject of the image to be processed in accordance with a preset feature parameter of the main subject region and the coordinates and size of the region to be recognized when the region to be recognized exists; and
    extracting an image of the main subject region as a foreground image for an extraction process of a foreground target, wherein the extracted image is processed as the main subject of the image to be processed.

2. The method according to claim 1, wherein determining whether the region to be recognized corresponding to the specified feature exists in the image to be processed includes:
    detecting whether a region corresponding to the specified feature exists in the image to be processed;
    performing profile detection on the region corresponding to the specified feature in the image to be processed when the region exists; and
    verifying a detected region in accordance with a parameterization appearance model corresponding to the specified feature to confirm whether the region is the region to be recognized corresponding to the specified feature.

3. The method according to claim 2, wherein:
    the specified feature includes a region of a human head and shoulders,
    the performing profile detection on the region corresponding to the specified feature in the image to be processed includes detecting a region corresponding to the region of the human head and shoulders in the image to be processed in accordance with an upper body detection algorithm and a head-shoulder profile detection algorithm, and
    the verifying a detected region in accordance with a parameterization appearance model corresponding to the specified feature includes verifying the detected region in accordance with a head-shoulder appearance model.

4. The method according to claim 3, wherein:
    the head-shoulder profile detection algorithm is obtained through training by an AdaBoost algorithm in combination with a HoG feature.

5. The method according to claim 1, further comprising:
in response to the determination that the region to be recognized does not exist, performing a significance-detection on the image to be processed, and determining the main subject region of the image to be processed in accordance with a significance value of each pixel in the image to be processed after the detection.

6. The method according to claim 5, wherein determining the main subject region of the image to be processed in accordance with the significance value of each pixel in the image to be processed after the detection includes:
performing a binarization process to a significance map including the significance values;
performing a clean-up process to one or more blocks of pixels that are smaller in size in the binarized significance map;
searching for a profile line of each color block of pixels in the image after performing the clean-up process, and approximating to the profile line of each block of pixels by a polygon; and
enclosing each polygon by a rectangle, and taking a peripheral rectangle frame enclosing all rectangles as the main subject region.

7. The method according to claim 1, wherein before extracting the image of the main subject region as the foreground image for the extraction process of the foreground target, the method further comprises:
performing superpixel segmentation on the image to be processed, and determining an average significance value of all pixels in each superpixel;
determining whether the average significance value of each superpixel is higher than a preset threshold successively;
setting an image mask value of each pixel in a superpixel to be nonzero when the average significance value of the superpixel is higher than the preset threshold; and
updating the main subject region by using a peripheral rectangle frame enclosing the pixels of nonzero image mask values.

8. The method according to claim 1, wherein extracting the image of the main subject region as the foreground image for the extraction process of the foreground target includes:
setting the image of the main subject region as the foreground image; and
performing a GrabCut algorithm on the foreground image.

9. A system for extracting a main subject of an image, the system comprising:
a memory storing a set of instructions; and
one or more processors configured to execute the set of instructions to cause the system to perform:
performing superpixel segmentation on the image to be processed;
determining an average color value of each segmented superpixel;
determining a background color of the image to be processed in accordance with the average color value of each superpixel;
determining a score of a solid color background of the image to be processed;
determining whether the image to be processed has a solid color background in accordance with the score of the solid background color, wherein the score of the solid color background includes a ratio of the number of pixels contained in a superpixel satisfying a color threshold of the background color to the total number of pixels of the image to be processed;
determining whether a region to be recognized corresponding to a specified feature exists in the image to be processed;
determining a main subject region containing the main subject of the image to be processed in accordance with a preset feature parameter of the main subject region and the coordinates and size of the region to be recognized when the region to be recognized exists; and
extracting an image of the main subject region as a foreground image for an extraction process of a foreground target, and take the extracted image as the main subject of the image to be processed.

10. The system according to claim 9, wherein determining whether a region to be recognized corresponding to a specified feature exists in the image to be processed further includes:
detecting whether a region corresponding to the specified feature in the image to be processed;
performing profile detection on the region corresponding to the specified feature in the image to be processed when the region corresponding to the specified feature exists, and
verifying a detected region in accordance with a parameterization appearance model corresponding to the specified feature to confirm whether the region is the region to be recognized corresponding to the specified feature.

11. The system according to claim 10, wherein:
the specified feature includes a region of a human head and shoulders,
performing profile detection on the region corresponding to the specified feature in the image to be processed includes detecting a region corresponding to the region of the human head and shoulders in the image to be processed in accordance with an upper body detection algorithm and a head-shoulder profile detection algorithm, and
verifying the detected region in accordance with a parameterization appearance model corresponding to the specified feature includes verifying the detected region in accordance with a head-shoulder appearance model.

12. The system according to claim 11, wherein:
the head-shoulder profile detection algorithm is obtained through training by an AdaBoost algorithm in combination with a HoG feature.

13. The system according to claim 9, wherein the one or more processors are further configured to execute the set of instructions to cause the system to perform:
in response to the determination that the region to be recognized does not exist, performing a significance detection on the image to be processed, and determining the main subject region of the image to be processed in accordance with a significance value of each pixel in the image to be processed after the detection.

14. The system according to claim 13, wherein determining the main subject region of the image to be processed in accordance with a significance value of each pixel in the image to be processed after the detection further includes:
performing a binarization process to a significance map including the significance values;
performing a clean-up process to one or more smaller color blocks of pixels in the binarized image;

searching for a profile line of each block of pixels in the image after performing the clean-up process, and approximate to the profile line of the each block of pixels by a polygon; and enclosing each polygon by a rectangle, and take a peripheral rectangle frame enclosing all rectangles as the main subject region.

15. The system according to claim 9, wherein before extracting the image of the main subject region as the foreground image for the extraction process of the foreground target, the one or more processors are further configured to execute the set of instructions to cause the system to perform:

performing superpixel segmentation on the image to be processed, and determine an average significance value of all pixels in each superpixel;

determining whether the average significance value of each superpixel is higher than a preset threshold successively;

setting an image mask value of each pixel in a superpixel as nonzero when the average significance value of the superpixel is higher than the preset threshold; and updating the main subject region by using a peripheral rectangle frame enclosing the pixels of nonzero image mask values.

16. The system according to claim 9, wherein extracting an image of the main subject region as a foreground image for an extraction process of a foreground target includes:

setting the image of the main subject region as the foreground image; and performing a GrabCut algorithm on the foreground image.

17. A non-transitory computer readable medium that stores a set of instructions that is executable by at least one processor of an apparatus to cause the apparatus to perform a method for extracting a main subject of an image, the method comprising:

performing superpixel segmentation on the image to be processed;

determining an average color value of each segmented superpixel;

determining a background color of the image to be processed in accordance with the average color value of each superpixel;

determining a score of a solid color background of the image to be processed;

determining whether the image to be processed has a solid color background in accordance with the score of the solid background color, wherein the score of the solid color background includes a ratio of the number of pixels contained in a superpixel satisfying a color threshold of the background color to the total number of pixels of the image to be processed;

determining whether a region to be recognized corresponding to a specified feature exists in the image to be processed;

determining a main subject region containing the main subject of the image to be processed in accordance with a preset feature parameter of the main subject region and coordinates and size of the region to be recognized when the region to be recognized exists; and extracting an image of the main subject region as a foreground image for an extraction process of a foreground target, wherein the extracted image is processed as the main subject of the image to be processed.

18. The non-transitory computer-readable medium of claim 17, wherein the set of instructions that is executable by the at least one processor of the apparatus to cause the apparatus to further perform:

in response to the determination that the region to be recognized does not exist, performing a significance detection on the image to be processed, and determining the main subject region of the image to be processed in accordance with a significance value of each pixel in the image to be processed after the detection.

* * * * *